US007760922B2

(12) United States Patent
Takahashi

(10) Patent No.: US 7,760,922 B2
(45) Date of Patent: Jul. 20, 2010

(54) FINGERPRINT READING METHOD FOR A SWEEP-TYPE FINGERPRINT SENSOR, FINGERPRINT READING SYSTEM AND PROGRAM

(75) Inventor: Nobuo Takahashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 688 days.

(21) Appl. No.: 11/172,830

(22) Filed: Jul. 5, 2005

(65) Prior Publication Data
US 2006/0002596 A1    Jan. 5, 2006

(30) Foreign Application Priority Data
Jul. 5, 2004    (JP)    ............... 2004-198236

(51) Int. Cl.
G06K 9/00    (2006.01)
(52) U.S. Cl. .................................... 382/124
(58) Field of Classification Search ................. 382/124, 382/125, 127, 115, 116; 713/186
See application file for complete search history.

(56) References Cited
U.S. PATENT DOCUMENTS

| 5,963,656 | A | * | 10/1999 | Bolle et al. | ................ | 382/124 |
| 7,184,579 | B2 | * | 2/2007 | Mizoguchi | ................ | 382/124 |
| 2003/0126448 | A1 | * | 7/2003 | Russo | ................ | 713/186 |

FOREIGN PATENT DOCUMENTS

| EP | 1 306 804 A1 | 5/2003 |
| JP | 10-91769 A | 4/1998 |
| JP | 11-253428 A | 9/1999 |
| JP | 2000-3442 A | 1/2000 |
| JP | 2001-155137 A | 6/2001 |
| JP | 2002-366950 A | 12/2002 |
| JP | 2003-30660 A | 1/2003 |
| JP | 2003-51013 A | 2/2003 |
| JP | 2003-208620 A | 7/2003 |
| JP | 2003-242489 A | 8/2003 |
| JP | 2003-248818 A | 9/2003 |
| JP | 2003-248820 A | 9/2003 |
| JP | 2003-248828 A | 9/2003 |
| JP | 2003-527650 A | 9/2003 |
| JP | 2003-303338 A | 10/2003 |
| JP | 2003-331269 A | 11/2003 |
| WO | WO 02/009034 A1 | 1/2002 |
| WO | 2004/026139 A1 | 4/2004 |

* cited by examiner

Primary Examiner—Brian Q Le
Assistant Examiner—Edward Park
(74) Attorney, Agent, or Firm—Sughrue Mion, PLLC

(57) ABSTRACT

A vast buffer memory space capable of storing all of partial fingerprint images read by a sweep type fingerprint sensor is made unnecessary in generating feature information of a fingerprint. A fingerprint reading system includes a sweep type fingerprint sensor, a memory which stores partial fingerprint images read by the sensor, and a processor connected to the sensor. The processor includes an image acquisition unit which successively acquires partial fingerprint images read by the sweep type fingerprint sensor and preserves them in the memory, a position calculation unit which calculates position information of a partial fingerprint image, an image division unit which cuts out a unique unit image corresponding to an image region having a predetermined area from the partial fingerprint image on the basis of the position information, and a feature extraction unit which extracts feature information of the unit image.

7 Claims, 8 Drawing Sheets

- 62: PARTIAL FINGERPRINT IMAGE
- 63: OVERLAPPING LENGTH
- 64: LENGTH OF PARTIAL FINGERPRINT IMAGE
- 61: PARTIAL FINGERPRINT IMAGE

- 61: PARTIAL FINGERPRINT IMAGE
- 72: UNIT REGION
- 73b: UNIT LENGTH
- 71: UNIT REGION
- 73a: UNIT WIDTH

FINGERPRINT READING METHOD FOR A SWEEP-TYPE FINGERPRINT SENSOR, FINGERPRINT READING SYSTEM AND PROGRAM

BACKGROUND OF THE INVENTION

1. Field of the Invention

The present invention relates to a fingerprint reading method of acquiring a fingerprint image of a finger and generating feature information of the fingerprint on the basis of the image. In particular, the present invention relates to a fingerprint reading method using the so-called sweep type fingerprint sensor to successively acquire a series of partial fingerprint images representing a fingerprint from a finger which conducts slide operation.

2. Description of the Related Art

Heretofore, personal authentication using a fingerprint is widely spread not only to identify a suspect in the police and judicial fields, but also as means in the general society for determining whether a person can be admitted to enter a room or whether a person can use an apparatus. Recently, it is also attempted to mount a mechanism which conducts such personal authentication by using a fingerprint, on a portable information device. In that case, it is demanded to make the size of the authentication mechanism small to the utmost.

As means satisfying the demand described above, a sweep type fingerprint sensor which successively reads fingerprint images from a finger which slides on a sensing surface having a lateral width equivalent to the width of the finger is known. Images obtained from the sweep type fingerprint sensor are no more than partial images corresponding to parts of the fingerprint. In order to obtain information which indicates where in a general image the acquired partial image is located, therefore, a method of joining partial images read by the sensor and reconstructing the general fingerprint image is adopted.

Techniques concerning this method have been disclosed in Japanese Patent Application Laid-Open Nos. 10-091769 and 2003-331269. According to the techniques, the general fingerprint image is reconstructed by successively superposing read partial fingerprint images one on another and the general fingerprint image is used to register and collate personal information.

According to the techniques disclosed in Japanese Patent Application Laid-Open Nos. 10-091769 and 2003-331269, it is possible to prevent a missing place from occurring in the general fingerprint image by superposing acquired partial fingerprint images one on another. According to the techniques, however, all partial fingerprint images read by the sensor are stored in a buffer memory and then the general fingerprint image is reconstructed. Therefore, a vast memory space is needed to conduct buffering. In addition, there is an inconvenience that the next processing of generating feature information of the fingerprint cannot be resumed until all partial fingerprint images are collected and the general fingerprint image is completed.

SUMMARY OF THE INVENTION

The present invention has been achieved in order to solve the above-described problems. An object of the present invention is to provide a fingerprint reading method capable of generating feature information of a fingerprint efficiently from fingerprint images read by a sweep type fingerprint sensor.

A fingerprint reading method according to the present invention is a method in which a system including a sweep type fingerprint sensor to read a series of partial fingerprint images which represent a fingerprint from a sliding finger executes an image acquisition process of acquiring a partial fingerprint image read by the sweep type fingerprint sensor, a position calculation process of finding position information of the partial fingerprint image when the partial fingerprint image has been acquired in the image acquisition process, an image division process of cutting out a unique unit image corresponding to an image region having a predetermined area from the partial fingerprint image on the basis of the position information when the position information has been found in the position calculation process, and a feature extraction process of extracting feature information of the unit image when the unit image has been cut out in the image division process.

A fingerprint reading system according to the present invention includes a sweep type fingerprint sensor to read a series of partial fingerprint images representing a fingerprint of a sliding finger, a memory to store partial fingerprint images read by the sensor, and a processor connected to the sweep type fingerprint sensor. The processor includes an image acquisition unit which successively acquires partial fingerprint images read by the sweep type fingerprint sensor, a position calculation unit which finds position information of a partial fingerprint image acquired by the image acquisition unit, an image division unit which cuts out a unique unit image corresponding to an image region having a predetermined area from the partial fingerprint image on the basis of the position information found by the position calculation unit, and a feature extraction unit which extracts feature information of the unit image cut out by the image division unit.

A program according to the present invention causes a computer connected to a sweep type fingerprint sensor for reading a series of partial fingerprint images which represent a fingerprint from a sliding finger to execute an image acquisition process of acquiring a partial fingerprint image read by the sweep type fingerprint sensor, a position calculation process of finding position information of the partial fingerprint image when the partial fingerprint image has been acquired in the image acquisition process, an image division process of cutting out a unique unit image corresponding to an image region having a predetermined area from the partial fingerprint image on the basis of the position information when the position information has been found in the position calculation process, and a feature extraction process of extracting feature information of the unit image when the unit image has been cut out in the image division process.

According to the present invention, it is not necessary to obtain all partial fingerprint images read by the sweep type fingerprint sensor when generating feature information of a fingerprint. Therefore, the processing of the process ranging from the fingerprint reading to the fingerprint collation processing is raised in efficiency. As a result, the processing time can be shortened.

DESCRIPTION OF THE PREFERRED EMBODIMENTS

Figure 1:
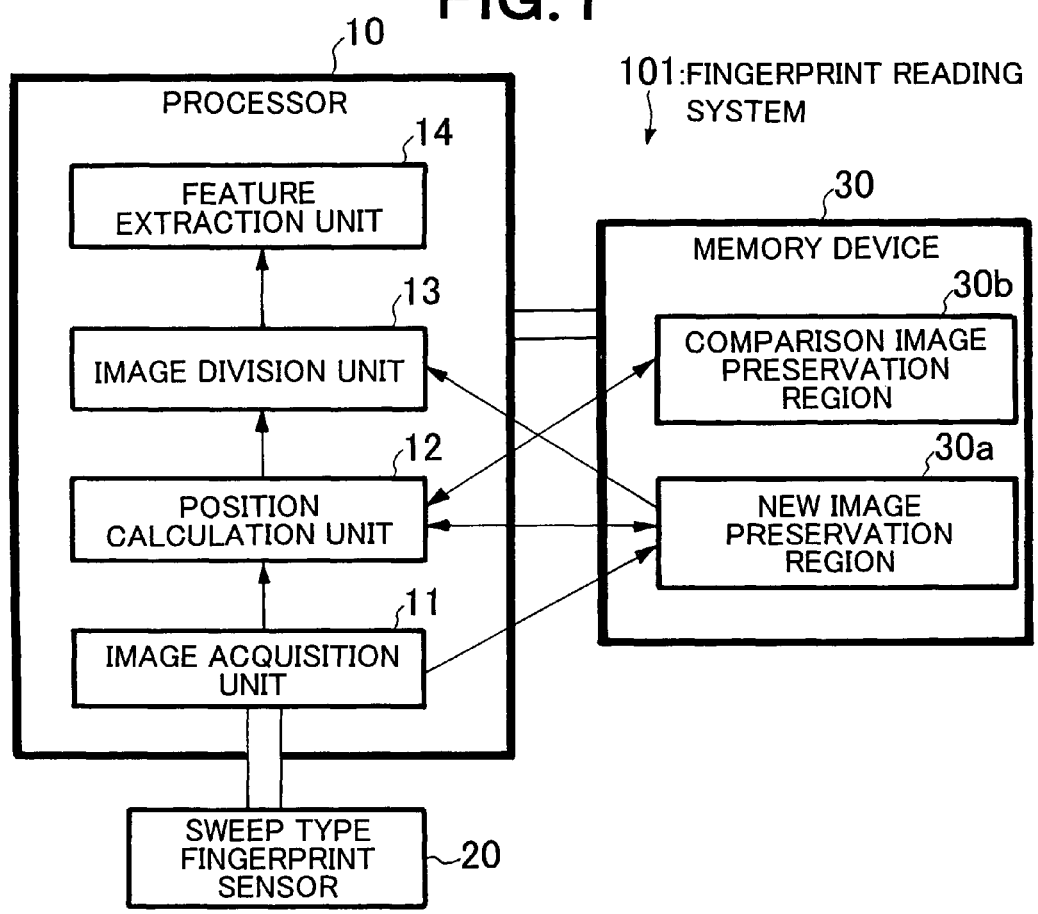
FIG. 1 is a block diagram of a fingerprint reading system in an embodiment according to the present invention.

Hereafter, embodiments of the present invention will be described in detail with reference to the drawings. FIG. 1 is a block diagram showing a configuration of an embodiment of a fingerprint reading system according to the present invention. A fingerprint reading system 101 in the embodiment fulfils a function of generating feature information of a fingerprint to conduct personal authentication in a personal digital assistant. As for the main hardware configuration, the fingerprint reading system 101 includes a processor 10 which executes a plurality of processes described later, a sweep type fingerprint sensor 20 connected to the processor 10, and a memory device 30 including a RAM which stores image data of a fingerprint read by the sensor 20 and a ROM which stores a program to execute the processes described later, as shown in FIG. 1.

The processor 10 may be either of a processor which executes the processes sequentially and a processor which executes the processes simultaneously in parallel. If the processor 10 executes the processes simultaneously in parallel, the execution is controlled by an operating system.

Figure 2:
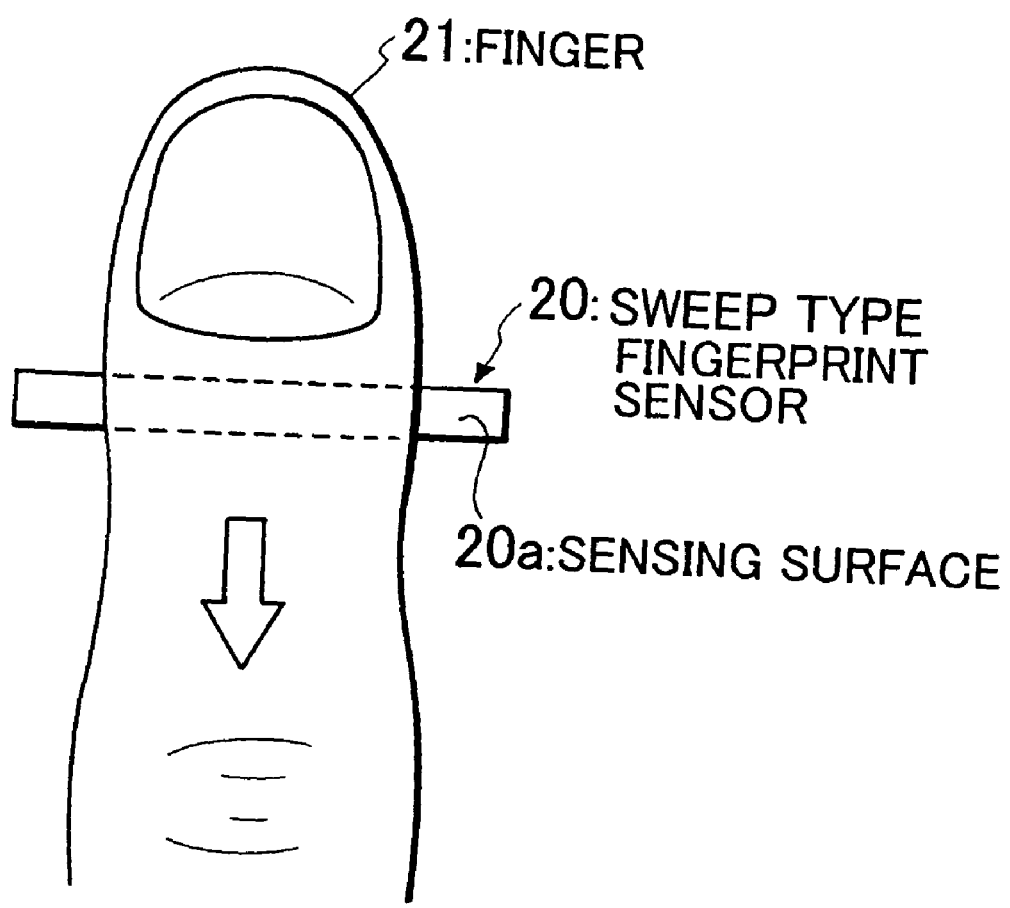
FIG. 2 is a diagram showing a sweep type fingerprint sensor in the embodiment.

For example, as shown in FIG. 2, the sweep type fingerprint sensor 20 includes a rectangular sensing surface 20a having a lateral width equivalent to the width of a finger 21. While the finger 21 conducts slide operation in a longitudinal width direction on the sensing surface, i.e., in a direction of an illustrated arrow, the sweep type fingerprint sensor 20 successively reads a series of partial fingerprint images under the control of the processor 10. The sweep type fingerprint sensor 20, the processor 10, and connection means between them should have a performance of reading a fingerprint at time intervals sufficiently shorter than the travel speed of the finger 21.

The memory device 30 includes a new image preservation region 30a and a comparison image preservation region 30b which can be accessed from components in the processor 10 described later.

As shown in FIG. 1, the processor 10 includes an image acquisition unit 11 which successively acquires partial fingerprint images by using the sweep type fingerprint sensor 20, a position calculation unit 12 which obtains position information of the partial fingerprint image acquired by the image acquisition unit 11, an image division unit 13 which cuts out a unique unit image corresponding to an image region having a predetermined area from the partial fingerprint image on the basis of the position information obtained by the position calculation unit 12, and a feature extraction unit 14 which extracts feature information of the unit image cut out by the image division unit 13. These units 11 to 14 fulfill functions of executing an image acquisition process, a position calculation process, an image division process, and a feature extraction process.

Figure 3:
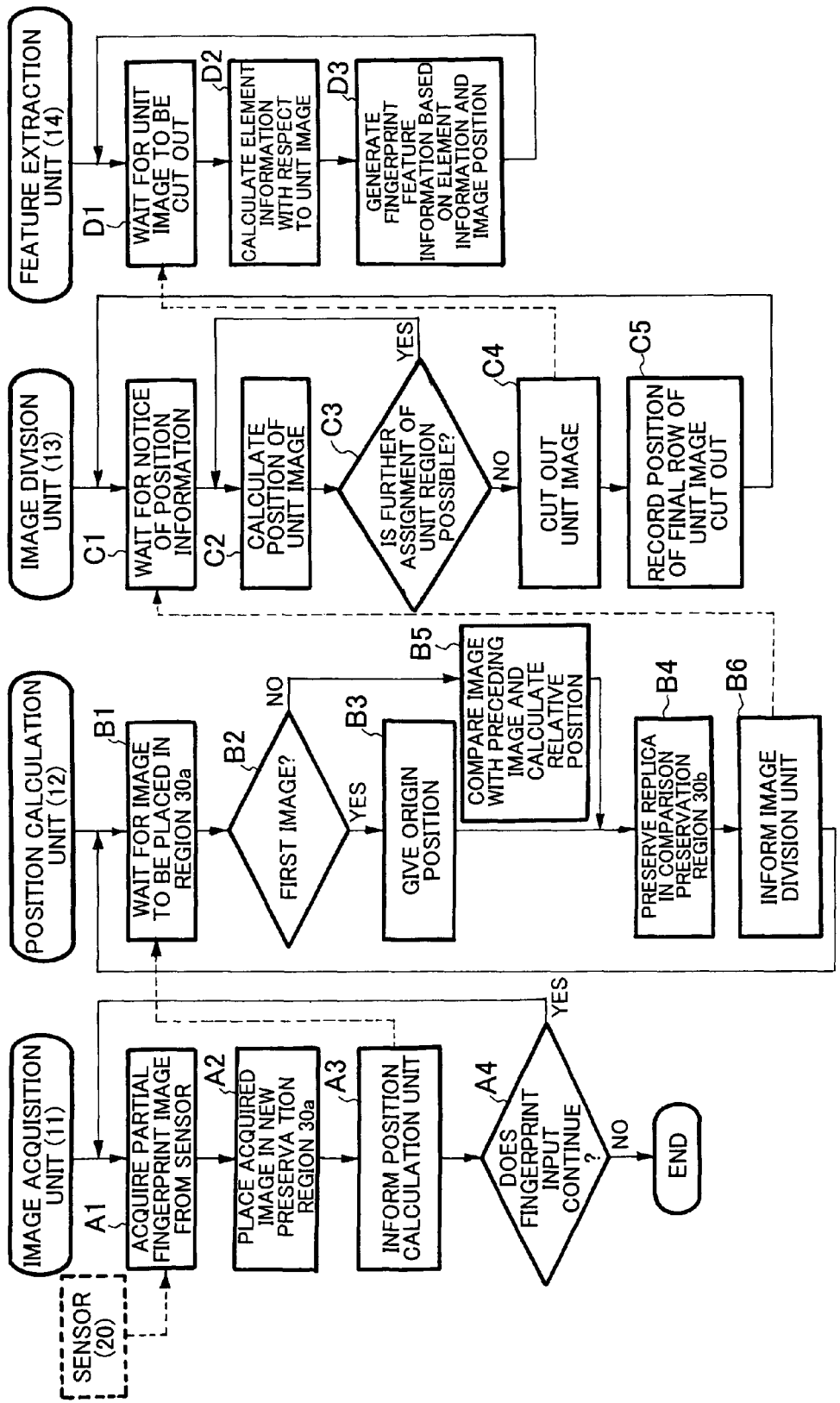
FIG. 3 is a flow chart showing an operation procedure in the embodiment.

An operation procedure of the fingerprint reading system 101 will now be described with reference to FIG. 3. When an operator who attempts to input a fingerprint causes the sweep type fingerprint sensor 20 to read the fingerprint as shown in FIG. 2, the fingerprint reading system 101 behaves as hereafter described.

First, a finger of the operator touches the sweep type fingerprint sensor 20, and a partial fingerprint image is read (step A1). At this time, the image acquisition unit 11 places this partial fingerprint image in the new image preservation region 30a (step A2), and informs the position calculation unit 12 to that effect (step A3). If a fingerprint of the subject finger 21 has, for example, a shape shown in FIG. 4, the partial fingerprint image takes the shape of a strip as represented by a partial fingerprint image 51 in FIG. 5. Each time a new partial fingerprint image is acquired (step A4), the image acquisition unit 11 executes the procedure of the steps A1 to A3.

The position calculation unit 12 waits for a partial fingerprint image read by the sweep type fingerprint sensor 20 to be placed in the new image preservation region 30a (step B1). Upon receiving the notice issued by the image acquisition unit 11 at the step A3, the position calculation unit 12 makes a decision whether the partial fingerprint image is a first image, i.e., a partial fingerprint image first input from the sweep type fingerprint sensor 20, or a second or later partial fingerprint image (step B2). As a result, if the partial fingerprint image is the first image, the position calculation unit 12 gives an origin position to this, recognizes the partial fingerprint image as a reference image (step B3), and preserves a replica of the image in the comparison image preservation region 30b (step B4).

Figure 6:
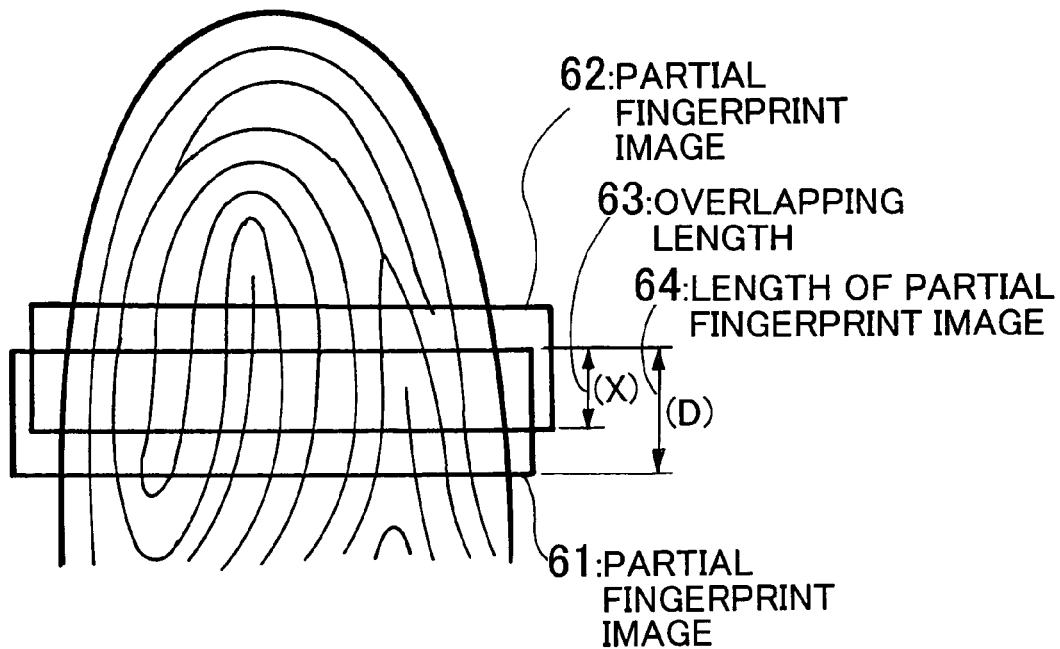
FIG. 6 is a diagram showing consecutive partial fingerprint images in the embodiment.

If the partial fingerprint image is not the first image as represented by, for example, a partial fingerprint image 62 with respect to a partial fingerprint image 61 in FIG. 6, the position calculation unit 12 compares in position relation the partial fingerprint image 62 with the partial fingerprint image 61 which is the preceding image already preserved in the comparison image preservation region 30b, and calculates a relative position of the partial fingerprint image 62 with respect to the partial fingerprint image 61 (step B5). Upon finishing the calculation, the position calculation unit 12 overwrites a replica of the partial fingerprint image 62 on the partial fingerprint image 61 in the comparison image preservation region 30b (step B4).

In addition, the position calculation unit 12 gives a notice to the effect that a partial fingerprint image has been newly preserved in the comparison image preservation region 30b, to the image division unit 13. The position calculation unit 12 also notifies the image division unit 13 of the origin position or the relative position which serves as the position information of the image (step B6).

The image division unit 13 waits for the notice of the position information (step C1). Upon receiving the notice based on the result obtained at the step B5 from the position calculation unit 12, the image division unit 13 calculates a position of a unit image described later in the partial fingerprint image (step C2). The unit image is an image portion corresponding to an image region having a predetermined area in the partial fingerprint image. Specifically, the unit image is an image portion of a region such as a unit region 71 in the partial fingerprint image 61 shown in FIG. 7. This unit region (71) is an image region defined by a unit width 73a which is nearly equal to that of a partial fingerprint image (61)

and a unit length 73b which is shorter than a minimum overlapping length of consecutive partial fingerprint images.

The unit length 73b will now be described further. Denoting a minimum value of length of an overlapping place of two partial fingerprint images such as an illustrated overlapping length 63 by X, a maximum sweeping velocity of the finger with respect to the sweep type fingerprint sensor 20 by V, a length 64 of a partial fingerprint image corresponding to the length of the sensing surface by D and reading time of the sensor by T, the minimum value X of the overlapping length 63 can be found by using the relation "X=D−VT." And a value smaller than the minimum value X is previously set as the unit length represented by the unit length 73b in FIG. 7.

Figure 7:
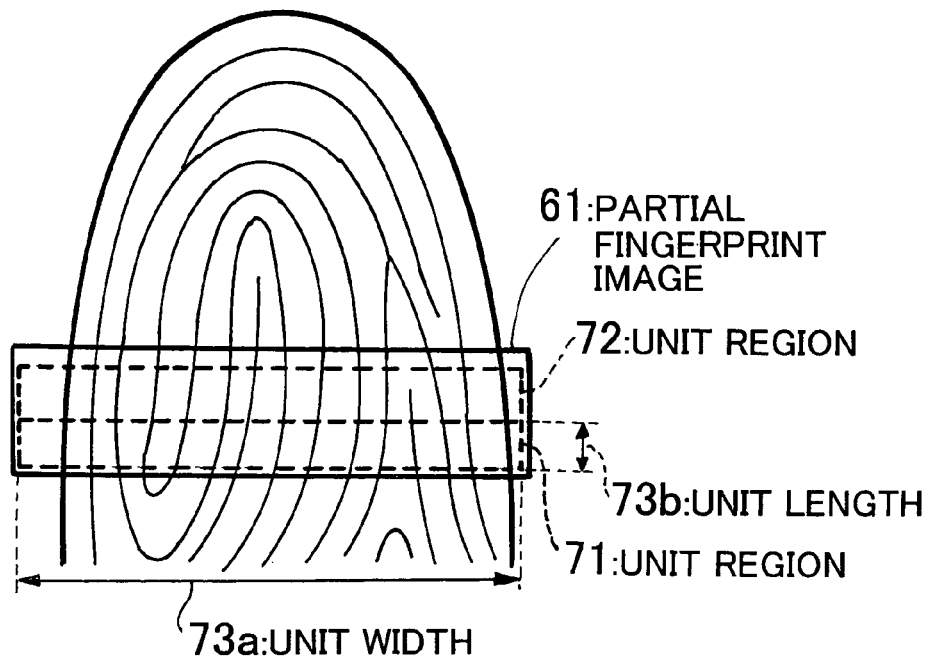
FIG. 7 is a diagram showing a unit region in the embodiment.

With respect to the partial fingerprint image 61 shown in FIG. 7, the image division unit 13 calculates the position of a unit image corresponding to the unit region 71 on the basis of position information of the partial fingerprint image 61, and then makes a decision whether a new unit region 72 subsequent to the unit region 71 can be assigned, i.e., whether the new unit region 72 falls in the partial fingerprint image 61 (step C3). As a result, if a new unit region (72) can be assigned as in the illustrated example, the image division unit 13 returns to the step C2 and calculates the position of the unit image. If new assignment is impossible, the image division unit 13 cuts out a unit image of a unit region from the partial fingerprint image 61 in the new image preservation region 30a (step C4).

The criterion of the decision at the step C3 will now be described. For example, supposing that the partial fingerprint image 61 shown in FIG. 7 is a first partial fingerprint image sent from the sweep type fingerprint sensor, the image division unit 13 first assigns the unit region 71 and the unit region 72 in the order beginning with the bottom of the partial fingerprint image 61, and then attempts to assign a unit region. In the example shown in FIG. 7, the image division unit 13 judges that a new unit region subsequent to the unit region 72 does not fall in the partial fingerprint image 61 and further assignment is impossible.

Figure 8:
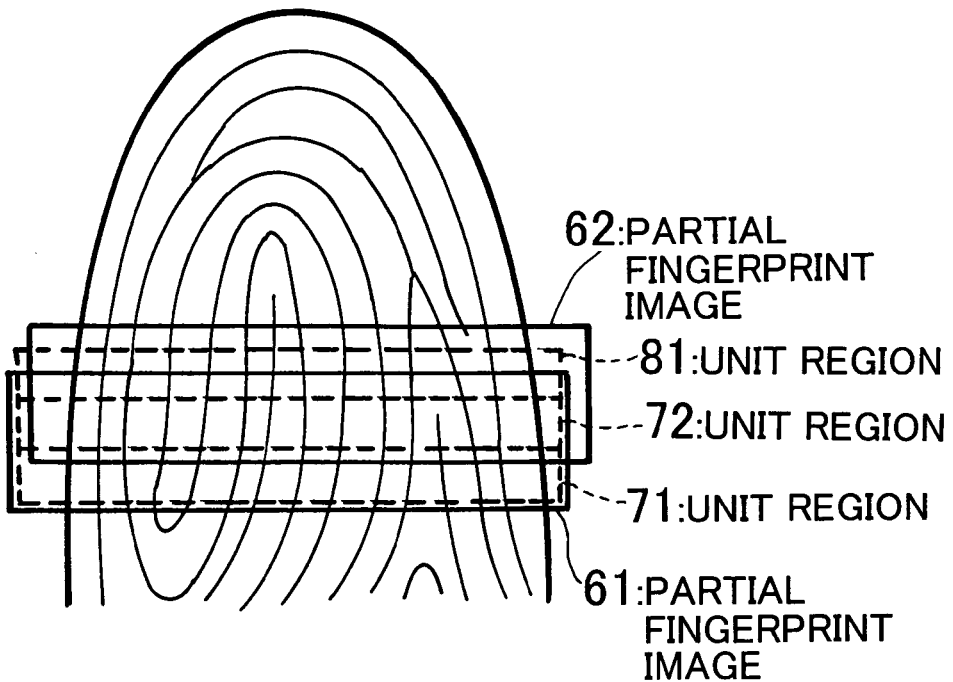
FIG. 8 is a diagram showing an assignment procedure of unit regions in the embodiment.

If thereafter a partial fingerprint image 62 is newly input from the sweep type fingerprint sensor 20 as shown in FIG. 8, the image division unit 13 assigns a unit region 81 subsequent to the unit region 72 to the partial fingerprint image 62. Besides the unit region 81, the unit region 72 is also included in the partial fingerprint image 62 at this time. Since the unit region 72 is already assigned to the partial fingerprint image 61, however, the unit region 72 is not adopted in the subsequent partial fingerprint image 62. Therefore, unit images obtained from the assigned unit regions (71, 72 and 81) become continuous images respectively representing unique fingerprint portions.

Figure 9:
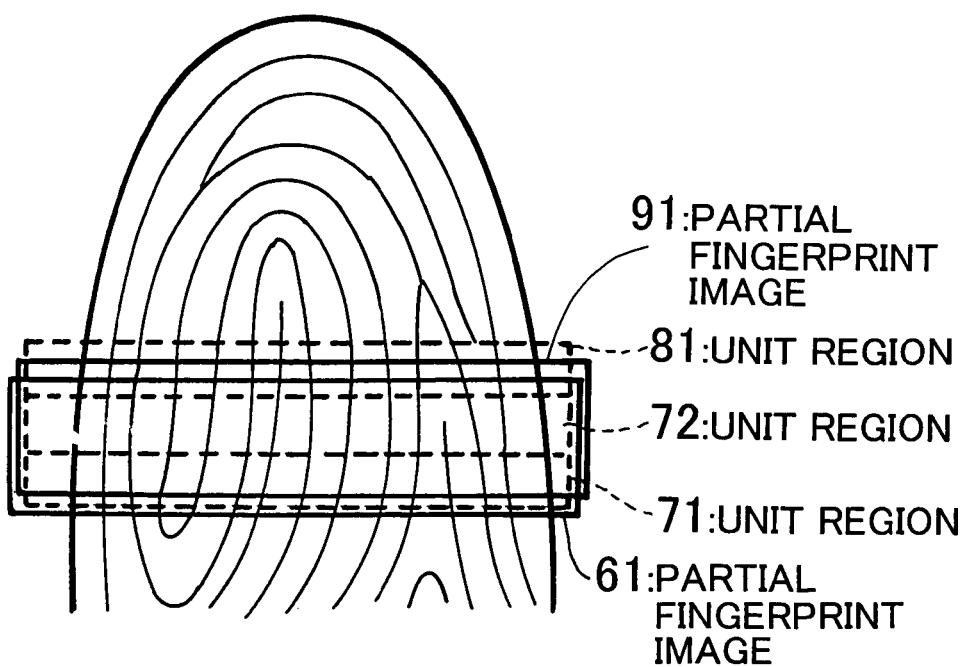
FIG. 9 is a diagram showing an assignment procedure of unit regions in the embodiment.

If the travel speed of the finger becomes slow with respect to the sweep type fingerprint sensor 20, the difference from the partial fingerprint image 61 which is the preceding image becomes minute as represented by a partial fingerprint image 91 in FIG. 9. In this case, a unit region is not assigned to the partial fingerprint image 91 under the decision that the partial fingerprint image 91 will not sufficiently house the new unit region 81.

In the decision whether a partial fingerprint image houses a unit region, a threshold concerning to what degree the partial fingerprint image (91) houses the unit region (81) is previously set. If the value is lower than the threshold, i.e., if the degree to which the unit region (81) gets out of the fingerprint image (91) is an allowable range, a decision to assign the unit region (81) to the partial fingerprint image (91) is made. As to a place which is within the allowable range and partially gets out of the allowable range, processing of covering the place with, for example, blank data is conducted and position relations between unit images are completely matched to maintain the continuity between the unit images.

The image division unit 13 cuts out as many unit images as possible from the partial fingerprint image, gives them to the feature extraction unit 14, and records the position of the final row of the unit image cut out (step C5). The final row corresponds to, for example, the unit image in the unit region 81 shown in FIG. 8. By thus recording the position of the final row, the start position of the next cutout can be identified rapidly.

The feature extraction unit 14 waits for a unit image to be cut out by the image division unit 13 (step D1). Upon receiving the unit image cut out, the feature extraction unit 14 calculates element information, such as direction components of a fingerprint upheaval line and image definition, of the unit image by using image processing using frequency analysis means such as fast Fourier transform processing (step D2). On the basis of the calculated element information and the position of the unit image, the feature extraction unit 14 generates feature information such as positions of branch points and end points of upheaval lines (step D3). Feature information generated by the feature extraction unit 14 is used in subsequent fingerprint collation processing.

Figure 4:
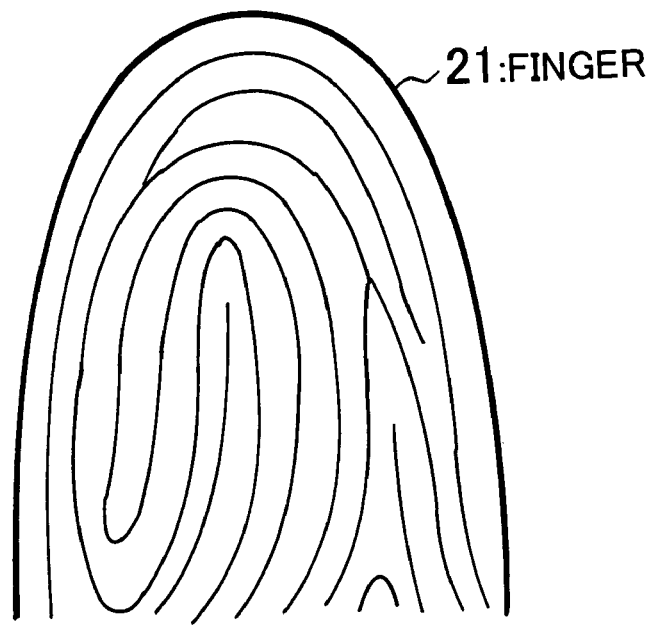
FIG. 4 is a diagram showing a fingerprint which becomes a processing subject in the embodiment.
Figure 5:
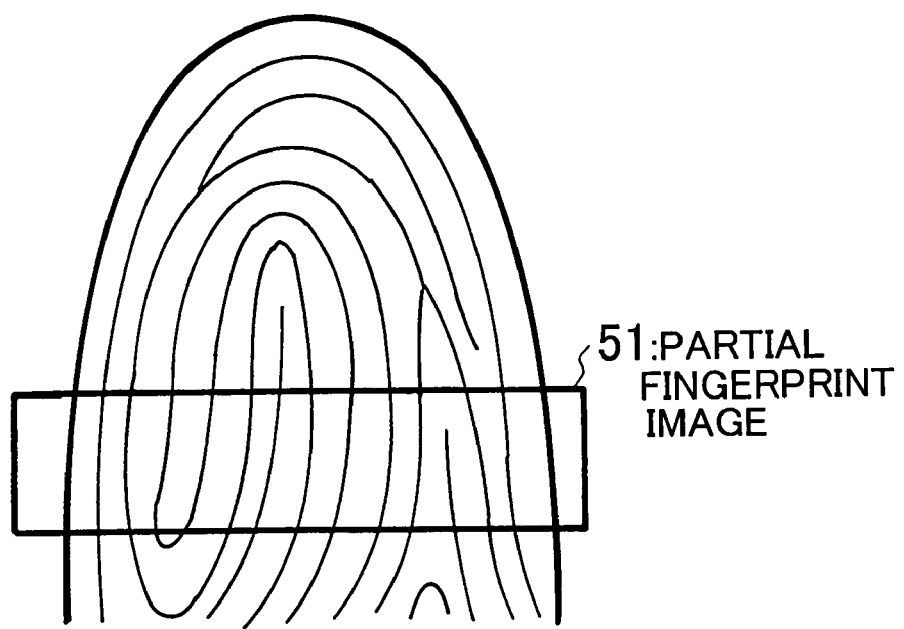
FIG. 5 is a diagram showing a partial fingerprint image in the embodiment.
Figure 10:
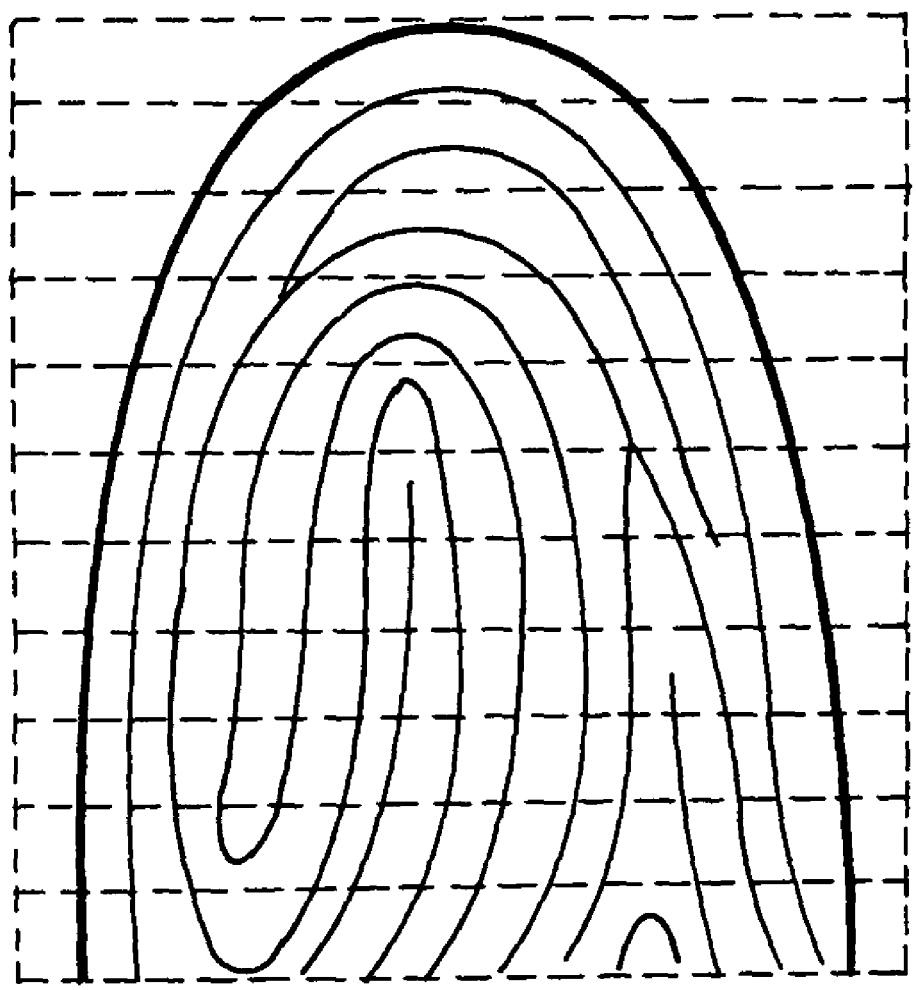
FIG. 10 is a diagram showing a unit image for a fingerprint in the embodiment.

By repeating the procedure described above, continuous unit images of the fingerprint of the finger shown in FIG. 4 which are not placed one upon another as shown in FIG. 10 are obtained. The feature extraction unit 14 does not wait until all unit images are obtained, but executes the steps D2 and D3 each time it receives each unit image.

According to the fingerprint reading system 101 in the embodiment heretofore described, a unique unit image is cut out from a partial fingerprint image each time the sweep type fingerprint sensor 20 reads it and feature information of the fingerprint is generated one after another from the images cut out. In generating feature information, therefore, it is not necessary to wait until all partial fingerprint images are preserved. Therefore, the processing time of the process from the fingerprint reading to the fingerprint collation processing can be shortened. In addition, partial fingerprint images to be simultaneously preserved are no more than two partial fingerprint images preserved in the new image preservation region 30a and the comparison image preservation region 30b. In buffering, therefore, a vast memory space becomes unnecessary.

Another Embodiment

Figure 11:
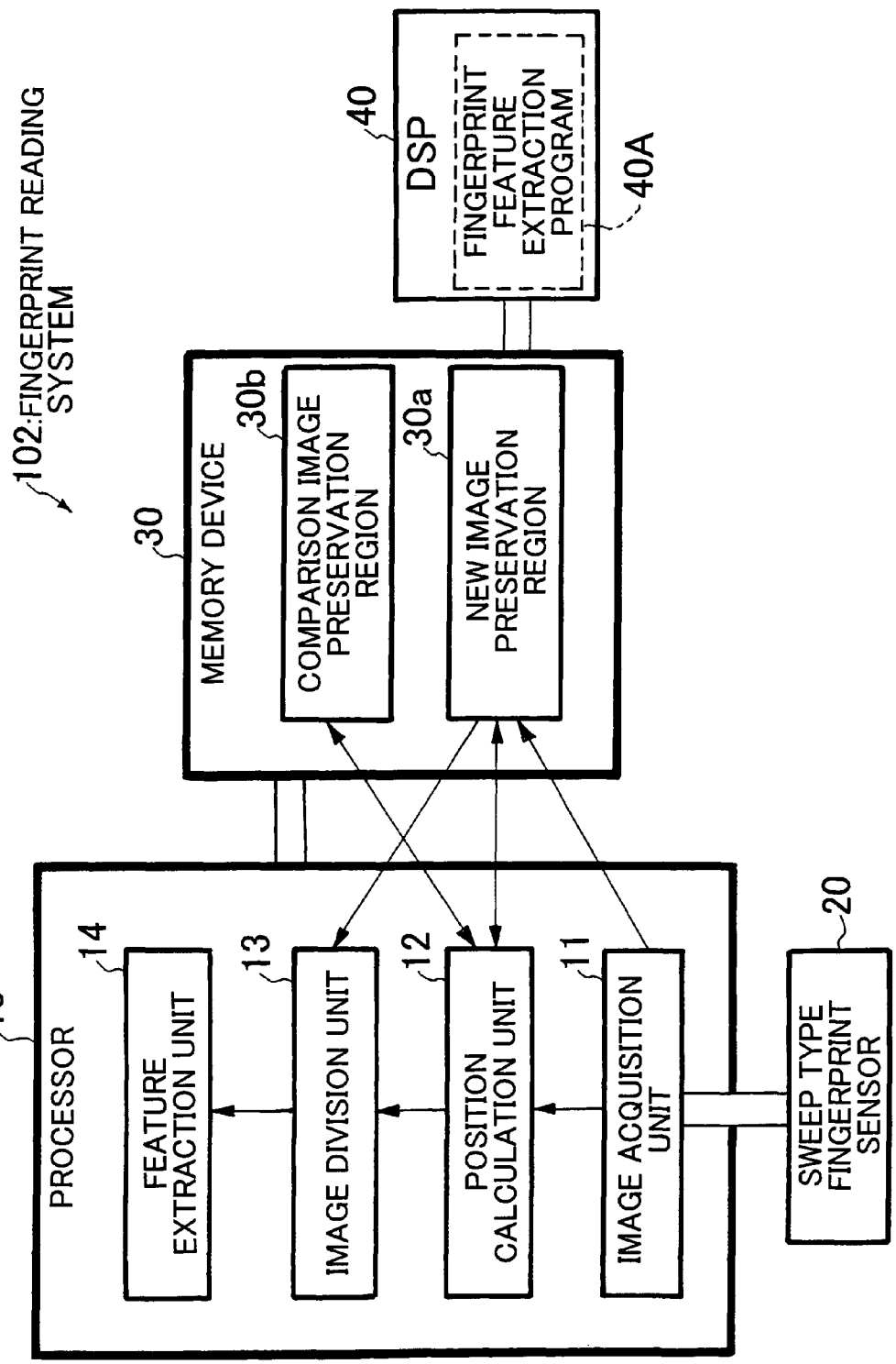
FIG. 11 is a block diagram of a fingerprint reading system in another embodiment of the present invention.

FIG. 11 is a block diagram showing a configuration of another embodiment of the fingerprint reading system. A fingerprint reading system 102 shown in FIG. 11 differs from the system shown in FIG. 1 in that a DSP (Digital Signal Processor) 40 which shares the memory device 30 with the processor 10 serving as the main processor is included and the DSP 40 executes a fingerprint feature extraction program 40A. The DSP 40 is a kind of conventionally known processor provided to execute specific arithmetic operation processing at a speed higher than the CPU serving as the main processor. In the present embodiment, the DSP 40 fulfils the function of the feature extraction unit of the fingerprint reading system according to the present invention.

An operation procedure of the fingerprint reading system 102 will now be described mainly as to a difference from that of the fingerprint reading system shown in FIG. 1. Each time the image division unit 13 receives a unit image cut out from a partial fingerprint image, the feature extraction unit 14 gives it to the DSP 40. The DSP 40 starts the fingerprint feature extraction program 40A, and generates feature information of the fingerprint by executing procedures similar to the steps D2 and D3 described with reference to FIG. 3 on the unit image received from the image division unit 13.

According to the fingerprint reading system 102 shown in FIG. 11, therefore, it is possible to generate feature information of a fingerprint simultaneously with the processing in the processor 10 serving as the main processor and at a processing speed faster than the processing in the processor 10 by providing the DSP 40. As a result, it becomes possible to shorten the processing time.

In the configuration shown in FIG. 11, the feature extraction unit supplies a unit image to be processed by the fingerprint feature extraction program 40A to the DSP 40. Alternatively, a configuration in which when the image division unit 13 has cut out a unit image it is directly delivered to the DSP 40, i.e., a configuration which makes the feature extraction unit 14 in the processor 10 unnecessary may be adopted.

In the embodiments described above, each unit region takes a shape as represented by, for example, the unit region 71 in FIG. 7. Instead of the unit width (73a) which is made nearly equal to the width of the partial fingerprint image (61), a dimension obtained by dividing the width of the partial fingerprint image into a plurality of equal parts may be used as the unit width. In that case, one unit region corresponds to one of equal parts obtained by longitudinally dividing, for example, the unit region 71 shown in FIG. 7.

By mounting a program for causing a computer to execute the operation procedure of the embodiment described above on various personal digital assistants having a sweep type fingerprint sensor such as a personal computer, its peripheral device, a portable telephone, a schedule terminal device or the like, personal authentication on the user of the device can be conducted in the same way as the procedures of the embodiments described above.

What is claimed is:

1. A fingerprint reading method in which a system comprising a sweep type fingerprint sensor to read a series of partial fingerprint images which represent a fingerprint from a sliding finger, the method comprising:
    using a processor to carry out the steps of:
    an image acquisition process of acquiring a partial fingerprint image read by the sweep type fingerprint sensor;
    a position calculation process of finding position information of the partial fingerprint image in accordance with order of acquisition of the partial fingerprint image when the partial fingerprint image is acquired in the image acquisition process;
    an image division process of cutting out a unique unit image corresponding to an image region having a predetermined area from the partial fingerprint image on the basis of the position information when the position information is found in the position calculation process; and
    a feature extraction process of extracting feature information on a feature of the fingerprint itself from the unit image when the unit image is cut out in the image division process,
    wherein in the position calculation process a decision is made whether the partial fingerprint image is a first partial fingerprint image read from the finger, and when the decision is negative, a relative position of the partial fingerprint image to a preceding image is calculated as position information of the partial fingerprint image.

2. The fingerprint reading method according to claim 1, wherein in the position calculation process, when the partial fingerprint image is the first partial fingerprint image, an origin position is set as position information of the partial fingerprint image.

3. The fingerprint reading method according to claim 1, wherein in the image division process, position information of a unit image cut out is recorded, and a new unit image subsequent to the unit image cut out is cut out.

4. A fingerprint reading system comprising a sweep type fingerprint sensor to read a series of partial fingerprint images representing a fingerprint of a sliding finger, a memory to store partial fingerprint images read by the sensor, and a processor connected to the sweep type fingerprint sensor, wherein
    the processor comprises:
    an image acquisition unit which successively acquires partial fingerprint images read by the sweep type fingerprint sensor;
    a position calculation unit which finds position information of a partial fingerprint image in accordance with order of acquisition of the partial fingerprint image by the image acquisition unit;
    an image division unit which cuts out a unique unit image corresponding to an image region having a predetermined area from the partial fingerprint image on the basis of the position information found by the position calculation unit; and
    a feature extraction unit which extracts feature information on a feature of the fingerprint itself from the unit image cut out by the image division unit,
    wherein with respect to subsequent partial fingerprint images except a first partial fingerprint image read by the sweep type fingerprint sensor, the position calculation unit calculates a relative position of the partial fingerprint image to a preceding image as position information of the partial fingerprint image.

5. The fingerprint reading system according to claim 4, wherein the position calculation unit sets an origin position as position information of the first partial fingerprint image read by the sweep type fingerprint sensor.

6. The fingerprint reading system according to claim 4, wherein the image division unit records position information of a unit image cut out, and cuts out a new unit image subsequent to the unit image cut out on the basis of the recorded position information.

7. The fingerprint reading system according to claim 4, wherein the processor comprises a first processor portion including the image acquisition unit and a second processor portion capable of conducting arithmetic operation processing which is faster than the first processor portion and including the feature extraction unit.

* * * * *